Sept. 9, 1941.  L. SAUER  2,255,535
DISPLAY CARD
Filed March 24, 1941  2 Sheets-Sheet 1
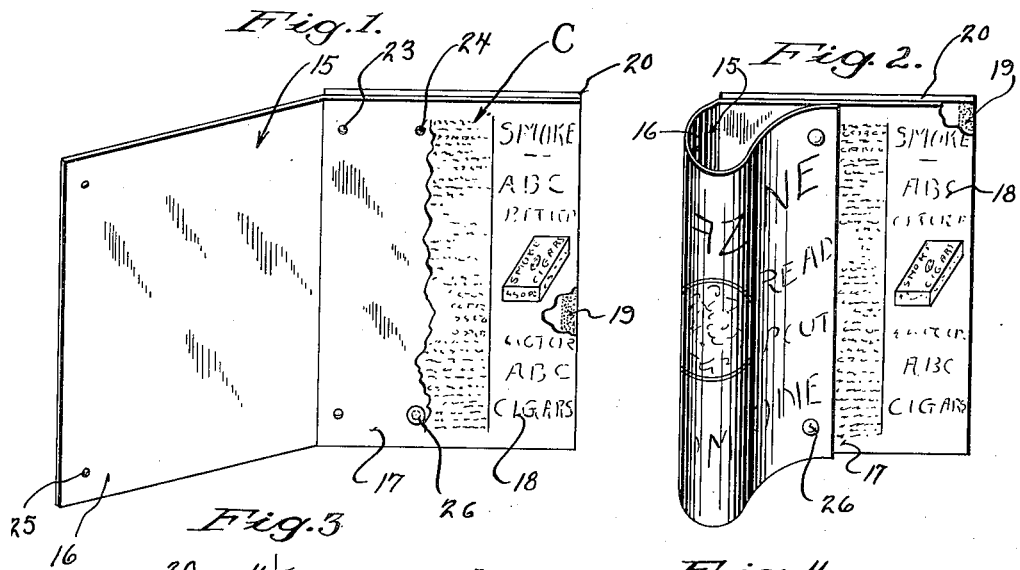
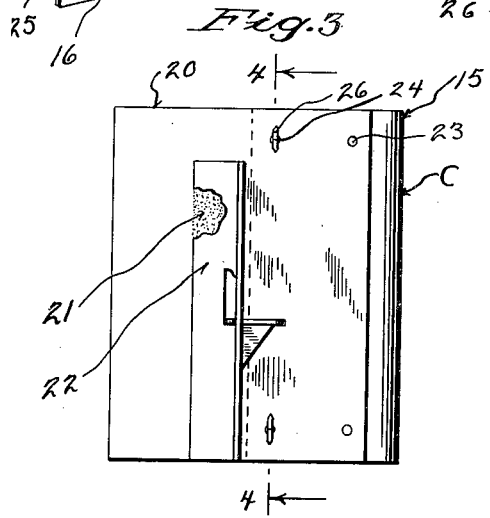
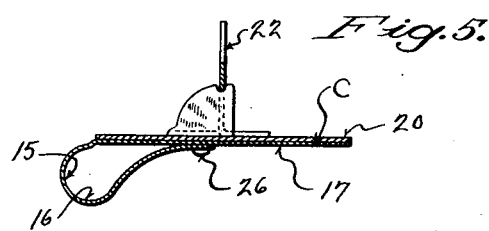
Inventor
L. Sauer
By
Attorneys

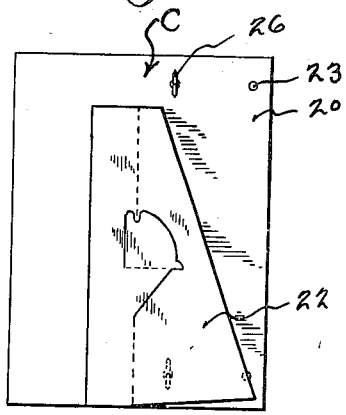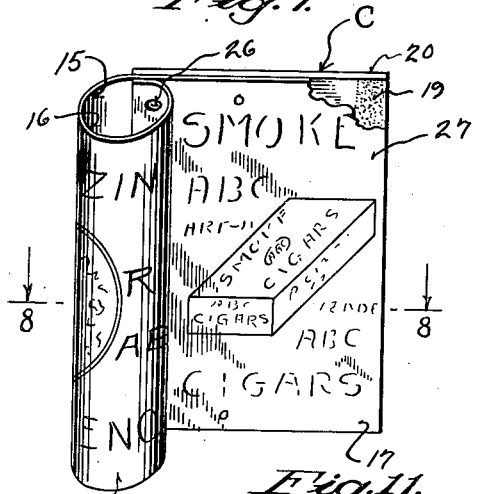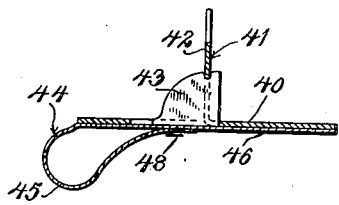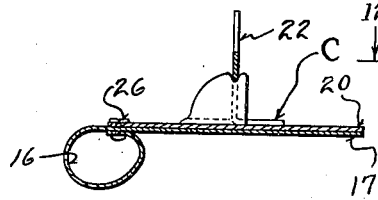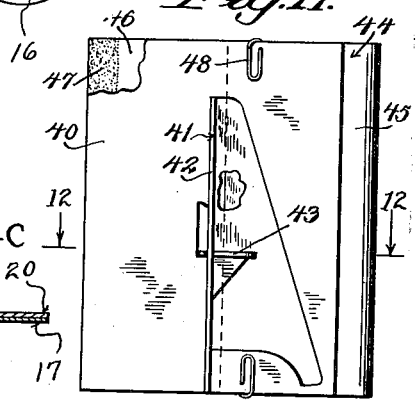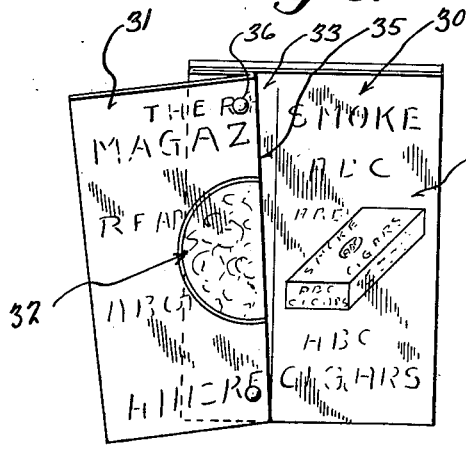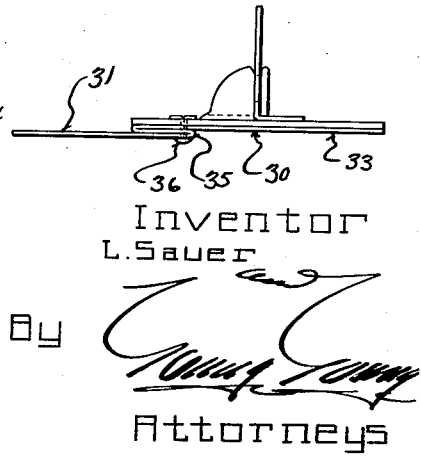

Patented Sept. 9, 1941

2,255,535

UNITED STATES PATENT OFFICE 2,255,535

DISPLAY CARD

Lloyd Sauer, Milwaukee, Wis.

Application March 24, 1941, Serial No. 384,832

7 Claims. (Cl. 40—124.1)

This invention appertains to display cards and the like, and more particularly to means for effectively showing certain selected advertising matter appearing in magazines to the general public.

In order to help sales of certain merchandise, it is the general practice of retail stores to display the attractive ads of national advertisers appearing in wellknown periodicals on their counters, show windows, etc., devoted to the sale of such merchandise. This necessitates employing either the entire magazine, with a poor display of the desired advertisement, or the mutilation of the magazine, and in all events the resultant set-up is a make-shift affair, and does not appeal to the buying public.

It is, therefore, one of the primary objects of this invention to specially print the cover of a national magazine and the desired advertisement appearing in the magazine in a predetermined relation relative to one another, and to mount the cover and advertisement in a novel way on a suitable supporting back, whereby both the magazine cover and the advertisement will be displayed in an attractive and forceful manner, so that the necessity of buying and displaying the entire magazine is eliminated.

Another salient object of my invention is to fix a cover of a magazine, with the desired advertisement printed on the inner face of the back cover sheet, on a supporting card or easel, with the front cover sheet free of the card, and with means whereby the front cover sheet can be folded or turned back in a novel way to attractively display both the cover sheet and the advertising matter.

A still further important object of my invention is to provide a magazine cover mounted on an easel having the desired advertisement printed on the inner face of the back cover sheet thereof and adjacent to the outer edge thereof, and paper fasteners extending through the easel and back cover sheet for detachably holding the front cover sheet folded partially over the back cover sheet to show the printed advertisement.

A still further object of my invention is to provide means for fastening the cover sheet of the magazine back in different positions to either display to view a full page ad or a part page ad.

With these and other objects in view, the invention consists in the novel construction, arrangement and formation of parts, as will be hereinafter more specifically described, claimed, and illustrated in the accompanying drawings, in which drawings:

Figure 1 is a perspective view of my novel display card showing the front cover sheet of the magazine in a full open position.

Figure 2 is a view similar to Figure 1, but showing the front cover sheet fastened back to display said front cover sheet and the desired advertisement.

Figure 3 is a rear, elevational view illustrating my display card, and showing the easel part thereof in its open position.

Figure 4 is a sectional view through the device, taken on the line 4—4 of Figure 3, looking in the direction of the arrows.

Figure 5 is a horizontal sectional view through my device, showing the same in its set-up position for use.

Figure 6 is a view similar to Figure 3, but showing the easel in its collapsed, flat position for facilitating shipping, and the like.

Figure 7 is a view similar to Figure 2 but showing the front cover sheet rolled back to display the outer face thereof, and a full page ad.

Figure 8 is a horizontal sectional view taken on the line 8—8 of Figure 7, looking in the direction of the arrows.

Figure 9 is a front elevational view illustrating a slightly modified form of my invention;

Figure 10 is a top plan view illustrating the modified form of my invention;

Figure 11 is a rear elevational view illustrating a further form of my device; and Figure 12 is a detailed, sectional view taken on the line 12—12 of Figure 11, looking in the direction of the arrows.

Referring to the drawings in detail, wherein similar reference characters designate corresponding parts throughout the several views, the letter C generally indicates my novel display device, and in accordance with this invention, I employ a magazine cover 15 including a front cover sheet 16 and a back cover sheet 17.

The outer face of the front cover sheet 16 has printed thereon the desired face of a selected magazine, and the inner face of the front cover sheet is preferably left blank to avoid expense of printing. The inner face of the back cover sheet 17 has specially printed thereon an advertisement 18 that appeared in the issue of the magazine, the cover of which is printed on the outer face of the front cover sheet. If the advertisement 18 that appeared in the issue does not occupy an entire page, then the advertisement is printed in the column adjacent to the outer edge of the back cover sheet, the purpose of which will be more fully set forth.

The outer face of the back cover sheet 17 is secured by a suitable adhesive 19 to a stiff supporting card 20, and this card can be of the same size as the back cover sheet. The supporting card 20 can have affixed to its rear surface, such as by an adhesive 21, a supporting easel 22, which can be of a folding character so that my device can be shipped flat.

The cover sheet 17 can be provided with an inner row of openings 23, and an outer row of openings 24, and these openings also preferably extend through the supporting card 20. The front cover sheet 16 adjacent to its outer edge is also provided with a row of openings 25. While as many openings can be made in each row as may be desired, I have found in actual practice that two openings in each row are sufficient for my purpose.

For the sake of convenience, pinned paper fasteners 26 are inserted in the row of openings 24, so that these fasteners will be instantly available when the device is set up for display.

When the retail store receives the device, the easel 22 is unfolded and placed in its open position, and the front cover sheet 16 is folded back to the position shown in Figure 2, and the paper fasteners 26 are removed from the openings 24 and are then inserted through both rows of openings 25 and 24. This effectively holds the front cover sheet in a position to be readily seen by the purchasing public, and the advertisement 18 is left uncovered to be also attractively displayed.

Obviously, with my invention it is not necessary to handle a bulky magazine, and the cover sheets are printed up specially with the desired advertisement to form a part of the device.

Where an entire page advertisement is to be displayed to view, the advertisement, indicated by the reference character 27 (see Figures 7 and 8) is printed on the entire front face of the back cover sheet, and the front cover sheet 16 is rolled back to aline the openings 25 with the openings 23, and the paper fasteners 26 are inserted through these openings. While the cover sheet 16 is rolled back in a substantially tubular form, the same can still be readily seen and observed by the public.

The front cover sheet can be folded back in different manners, and in Figures 9 and 10, I have illustrated a slightly modified form of my invention. As illustrated in these figures, I employ a specially printed magazine cover 30, and the front cover sheet 31 thereof has the face of the magazine printed on its inner surface instead of its outer surface, as is indicated by the reference character 32.

The inner surface of the back cover sheet 33 has the desired advertisement 34 printed thereon, and this advertisement ends at the outer edge of said back cover sheet.

To display the matter to view, the front cover sheet 31 is folded back on itself on a diagonal line, as is indicated by the reference character 35, and paper fasteners 36 are inserted through the folded portions of the front cover sheet, and through the back cover sheet and the supporting cards. This will attractively display to view both the design of the magazine cover and the advertisement.

In Figures 11 and 12, I have shown a still further and preferred form of my invention, and in this form the stiffening back member or card 40 has struck out therefrom the easel 41. The easel is of the collapsible type, and embodies the hinged supporting standard 42, and the hinged locking flap 43. As the easel 41 is struck directly out from the stiffening back member or card 40, the same can readily fold flat and lie in the same plane with the inner and outer faces of said card. The card carries the magazine cover 44, and as in the other forms of my invention, the cover 44 includes a front cover sheet 45 and the back cover sheet 46. The back cover sheet 46 is secured at its inner edges only to the stiffening back member or card 40, and a suitable adhesive 47 can be utilized for this purpose. This leaves the back sheet 46 free along one edge for facilitating the opening and closing of the easel 41. The front cover sheet 45 has printed thereon the design of a selected magazine front, and the front face of the back cover sheet 46 has printed thereon the desired advertisement.

Paper fasteners 48 of the clip type can be utilized for holding the front cover sheet 45 in its rolled back position, to permit observers to clearly see the design of the front of the magazine and the advertisement. It is to be also noted that the paper clips 48 engage the stiffening back member or card 40, and this holds the loose portion of the back cover sheet 46 against flapping movement when my device is set up for display.

I lay great stress on the fact that the easel 41 forms a part of the card 40, as this reduces the cost of the device, and the trouble incident to the assembling of the easel on the supporting card where the easel is made separate and glued to said supporting card. Also, in view of the fact that the easel forms a direct part of the card, I am enabled to decrease the weight of the device, and hence the cost of mailing my device is considerably lowered. This is an important item where many thousands of the cards are mailed out weekly or monthly.

Other changes in details can be made without departing from the spirit or the scope of my invention, but what I claim as new is:

1. A device for displaying magazine covers and advertisements appearing in a magazine comprising, a magazine cover having printed on one face thereof the design of the front of the magazine and on its back cover sheet an advertisement to be displayed to view, and means for detachably holding the front cover sheet back partially over the back cover sheet to display both the design of the magazine front on the front cover sheet and the advertisement on the back cover sheet to view.

2. A device for attractively displaying advertisements in magazines comprising, a cover including a front cover sheet and a back cover sheet, a supporting card rigidly fastened to the outer face of the back cover sheet, the front face of the back cover sheet having advertising matter thereon, the front cover sheet having the design of a front of a magazine thereon, and detachable means for holding the front cover sheet in a folded position over the back cover sheet to display the advertising matter to view.

3. An advertising device comprising, a cover including a front cover sheet and a back cover sheet, a stiffening member for said back cover sheet, said back cover sheet having an advertisement thereon which is to be displayed, and the front cover sheet having a magazine front printed thereon, said back cover sheet and stiffening member therefor having openings therein and said front cover sheet having openings therein, said front cover sheet being folded back over the back cover sheet with the openings in alinement and paper fasteners extended through said openings.

4. An advertising display device comprising, a cover having a front cover sheet and a back cover sheet, a stiffening member for the back cover sheet, said back cover sheet having an advertisement printed thereon and said front cover sheet having the design of a magazine front printed on its outer surface, a collapsible easel secured to the back of the stiffening member, and means detachably securing the front cover sheet in a rolled position over the back cover sheet to display to view both the advertisement and the design of the magazine.

5. A device for displaying advertisements comprising, a cover including a front cover sheet and a back cover sheet, a stiffening member for the back cover sheet, said back cover sheet having an advertisement thereon which is to be displayed, and said front cover sheet having the design of a periodical printed on its inner face, said front cover sheet being adapted to be folded back on itself to display said design to view and the advertisement to view, and paper fasteners inserted through the folded portions of the front cover sheet, the rear cover sheet and the stiffening member.

6. An advertising display device comprising, a cover having a front cover sheet and a back cover sheet connected together, a stiffening member for the back cover sheet, said stiffening member having a collapsible easel struck out therefrom, and means detachably securing the front cover sheet in a rolled position over the back cover sheet to partially display both the front cover sheet and back cover sheet to view.

7. An advertising display device comprising, a magazine cover including a front cover sheet and a back cover sheet connected together, a stiffening card for the back cover sheet, said back cover sheet being secured at its outer edge to the outer face of the card, whereby to leave the major portion of the back cover sheet free, a collapsible supporting easel struck out from said card, and clips detachably securing the front cover sheet in a rolled position over the back cover sheet to partially display both the front cover sheet and back cover sheet to view, said clips also fastening the free portion of the back cover sheet to the card.

LLOYD SAUER.